3,453,112
HEAT-DEVELOPABLE DIAZOTYPE MATERIAL
André Schaeffer, Rueil-Malmaison, France, assignor to Etablissements Bauchet & Cie, Rueil-Malmaison, France, a French body corporate
No Drawing. Filed Nov. 22, 1960, Ser. No. 70,918
Claims priority, application France, Nov. 23, 1959, 811,009
Int. Cl. G03c 1/58, 1/54
U.S. Cl. 96—91     7 Claims The present invention relates to the diazotype art and one object thereof is to provide materials, such as papers, suitable for this type of reproduction and capable of being developed by heating and not by use of gaseous or liquid reagents as has heretofore been the case.

It is known that the diazotype processes are based on the ability of the diazonium compounds contained in a diazotype material to form dyes with coupling agents at such points which are protected by the black areas of the original to be reproduced during exposure of said material to light. The latent image thus obtained is subsequently developed on contact with either gaseous ammonia or alkaline baths which may contain the coupling agent when the latter is not incorporated in the diazotype material. This developing process is based on the neutralization of the acids initially incorporated in the diazotype material for the purpose of stabilizing said material and preventing any untimely destruction or coupling reaction of the diazonium compound.

Both types of development set forth above have obvious drawbacks; the use of ammonia causes handling of an unpleasantly smelling gas, and the use of baths frequently results in harmful effects on the stability of the resultant reproductions.

Many attempts have therefore been made for finding alternate methods of development, notably a developing process involving the sole action of heat. No heat-developable diazotype material, however, has heretofore given full satisfaction in actual practice since all the products tested proved unstable on storage.

It is the purpose of the present invention to obviate this drawback by providing a heat-developable diazotype material which will also be stable to ordinary temperature conditions.

The product according to the present invention, which contains a diazonium compound and a coupling agent, is characterized in that it contains as stabilizer the minimum sufficient amount of an acid compound having a dissociation constant of $10^{-3}$ or more for adjusting the pH of the diazotype material between 1 and 3, and preferably between 1 and 2, and as developing agent a material which is inert below 100° C. but which is capable of reacting with the acid derivative at higher temperatures for effecting the neutralization of said derivative, said developing agent being present in such an amount that, on heating, the pH of the diazotype material will reach a value in excess of 5 and preferably between 6 and 7.

Said developing agent is, preferably, urea, thiourea, sulfamide, or a substituted derivative thereof by organic radicals, or a mixture of two or more of said compounds. The developing agent may therefore be represented by the general formula:

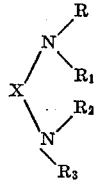

where X is an O=C<, S=C< or $O_2$S< group, and where R, $R_1$, $R_2$ and $R_3$ are hydrogen, alkyl, alkenyl or aryl groups, two a at most of the R, $R_1$, $R_2$ and $R_3$ radicals not being hydrogen. The following specific compounds can thus be used for this purpose either singly or in admixtures: urea, methylurea, dimethylurea, ethylurea, methylolurea, dimethylolurea, thiourea, ethylthiourea, ethylallylthiourea, sulfamide, methylsulfamide, dimethylsulfamides, ethylsulfamide, diethylsulfamides, phenylsulfamide, etc.

It has already been suggested that heat-developable diazotype materials could be obtained by incorporating into said materials derivatives capable of neutralizing on heating the acid stabilizers normally contained therein. Failure of these former attempts, however, is due to the fact that the commonly used weak acids were kept as stabilizers. Large amounts of said weak acids must be employed for adjusting the pH of the diazotype material to a value sufficiently low for insuring stabilization. Therefore, large amounts of developing agent must be employed for the heat-neutralization of said acids. Due to the large amount of developing agent involved, said agent reacts already in the cold with the stabilizing acids, and the resultant diazotype materials are therefore unstable.

This drawback is prevented according to the present invention by using as stabilizing agents acid compounds having a dissociation constant which equals at least $10^{-3}$; By virtue of this characteristic, a small amount of said compound is sufficient for stabilizing the diazotype material, and it follows that an equally small amount of stabilizing agent is sufficient, so that no reaction will occur without heating: Acid compounds having this characteristic may be selected among the organic acids, the acid salts of organic acids, or the derivatives of inorganic diacids having a free acid function.

The following acid compounds may be employed: maleic acid, fumaric acid, malonic acid, methane or ethane sulfonic acid, benzene sulfonic acid and the homologs thereof, the acid oxalates, the acid fumarates, the acid maleates, the acid malonates, sulfamic acid, the acid sulfates.

Among the acid compounds having a dissociation constant in excess of $10^{-3}$, some are especially interesting viz: those which lose their acidity when the temperature is raised. In this case, in fact, heat-developing of the diazotype material which occurs at about 120–160° C., will be obtained both by the neutralization of the developing agent of the acid stabilizer and by the decrease of the inherent acidity of the latter. Thus, the more rapid increase of the pH value will promote the formation of dye, and the copy will have a greater "density."

Simultaneously, since the developing agent concentration may be reduced, the resultant diazotype papers will have improved resistance to untimely coupling.

Utilizable acid compounds which lose their acidity on heating may be divided into a number of categories with respect to the manner in which they lose said acidity and to the side-products they release in the course of this process.

A first class, or class A, of said compounds consists of those acid compounds which, beside the acid group (particularly a carboxyl group), contain a second functional group (such as an alcohol or acid group) capable of reacting upon heating with the first acid group to give products such as lactones, lactides or anhydrides.

To this class belong notably lactic acid:$CH_3CHOH$ COOH and glycolic acid:$HOCH_2COOH$.

A second class, or class B, consists of the carboxylic acids which spontaneously decarboxylate on heating.

This category of products has a larger array of potential applications than class A products. Experience shows that in order to obtain sufficiently rapid degradation at the temperature levels involved in the heat-developing process, it is necessary most of the time that the carboxy group responsible for the acidity of said products be labilized by an electronegative group such as a carbonyl, cyan, halogen, nitro group or yet by means of a double or a treble bond. Said groups must preferably be situated in close proximity to the acid function, in alpha or beta position.

The presence of such a group offers the additional advantage of strongly reinforcing the acidity of the carboxy group, which makes it possible to effect stabilization of the emulsion with a lesser amount of acid compound and thus, as set forth above, to effect still more rapid developing.

Among the compounds satisfying said definition, the following may be listed (the decomposition temperature is given facing the name of the acid).

1. The monoamides of oxalic acid:

NH$_2$COCOOH
Oxamide, 210° C.

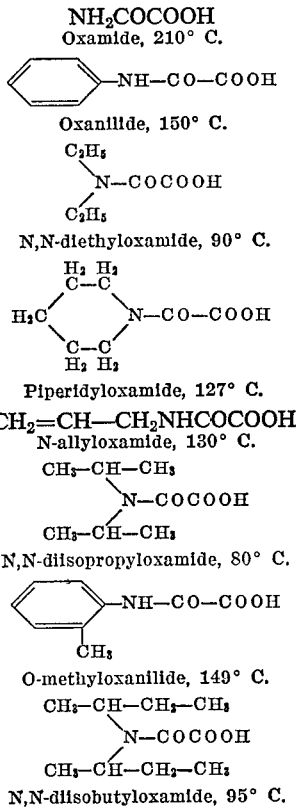

Oxanilide, 150° C.

N,N-diethyloxamide, 90° C.

Piperidyloxamide, 127° C.

CH$_2$=CH—CH$_2$NHCOCOOH
N-allyloxamide, 130° C.

N,N-diisopropyloxamide, 80° C.

O-methyloxanilide, 149° C.

N,N-diisobutyloxamide, 95° C.

2. The alpha-ketoacids and the halogen or nitro derivatives thereof:

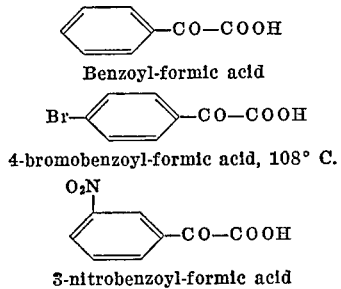

Benzoyl-formic acid 4-bromobenzoyl-formic acid, 108° C.

3-nitrobenzoyl-formic acid

3. Certain malonic or acetoacetic derivatives such as:

HOOC—CH$_2$—COOH
Malonic acid

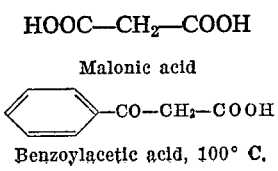

Benzoylacetic acid, 100° C.

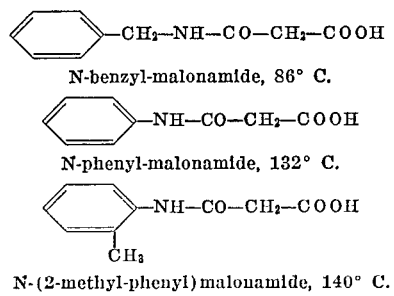

N-benzyl-malonamide, 86° C.

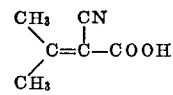

N-phenyl-malonamide, 132° C.

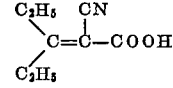

N-(2-methyl-phenyl)malonamide, 140° C.

4. Certain cyanoacids having preferably simultaneously a double bond in close proximity to the cyano group, such as:

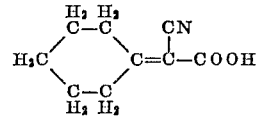

Beta, beta-dimethyl-alpha-cyanoacetic acid, 140° C.

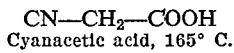

Beta,beta-diethyl-alpha-cyanoacetic acid, 75° C.

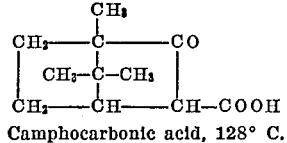

Cyclohexylidene-cyanoacetic acid, 120° C.

CN—CH$_2$—COOH
Cyanacetic acid, 165° C.

5. Cyclic derivatives with a juxtanuclear carboxyl group such as:

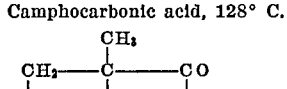

Camphocarbonic acid, 128° C.

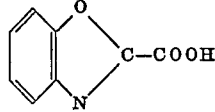

Bromocamphocarbonic acid, 110° C.

Benzoxazole-carbonic acid, 100° C.

6. Nitro acids such as:

NO$_2$CH$_2$COOH
Nitroacetic acid

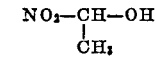

Alpha-nitropropionic acid, 61° C.

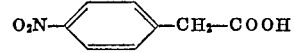

4-nitrophenylacetic acid, 150° C.

7. Acetylenic acids such as:

HOOC—C≡—COOH
Acetylene-dicarboxylic acid, 175° C.

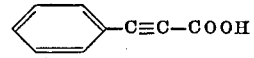

Phenylpropiolic acid (sublimation), 137° C.

class C, is constituted by those compounds which lose their acidity on heating with release of an alkaline product, generally ammonia.

The usefulness of such products is obvious. Indeed, considering the acids of class B, it will be understood that the presence of acid groups (generally sulfo groups) in the coupling agents may establish the pH at a level which is too low for adequate heat-developing: addition of a sometimes nonnegligible amount of a derivative of urea, thiourea or sulfamide will therefore be necessary. With class C acids, which release an alkaline agent on decomposition, this proportion can be reduced, with the added advantage of producing a paper having improved storage properties.

Products belonging to said category are ureides having the following type:

Where ureides are concerned, there is the added feature of the release of ammonia which is due to the "urea" portion of the molecule.

Among the compounds belonging to this group and which are useful within the scope of the present invention, the following can be listed:

|  |  | Melting | Decomposition |
|---|---|---|---|
| CN—C—COOH<br>‖<br>NOH | Cyanacetic acid oxime | 130° C. | 130° C. |
| CH₃—C—COOH<br>‖<br>NOH | Propionic acid oxime |  | 180° C. |
| ⌬—C—COOH<br>‖<br>N—OH | Benzoyl-formic acid oxime |  | 127° C. |
| Br—⌬—C—COOH<br>‖<br>N—OH | p-Bromobenzoyl-formic acid oxime |  | 185° C. |

It must be mentioned, however, that since the acid character of said oximes is obviously less marked than that of the keto-acids, the best results will be obtained when they are utilized as "supplementary" decomposable acid agents. This embodiment of the present invention, which can also be used with respect to the derivatives of classes A, B and C, will be more fully illustrated in one of the examples given hereinbelow.

The importance of the selection of said acid compounds according to the present invention can be demonstrated

|  |  | Decomposition, ° C. | NH₃ evolved at— |
|---|---|---|---|
| CHONHCONHCOCOOH | Formyl-oxaluric acid | 175 | 140° C. |
| CHONHCONHCO—CH₂—C(OH)(COOH)—CH₂COOH | Formyl-citryluric acid | 120 | 155° C. |
| NHCONH—COCH₂—C(OH)(COOH)—CH₂—COOH | Citryluric acid | 130 | 150° C. |
| CH₂=CH—CH₂NHCONHCOCOOH | Allyl-oxaluric acid | 110 | 150° C. |
| CHONHCONHCOCH=CH—COOH | Formyl-maleyluric acid | 180 | 200° C. |
| NH₂CONHCOCOOH | Oxaluric acid | 135 | 160° C. |
| C₂H₅NHCONHCOCOOH | Ethyl-oxaluric acid | 167 | 185° C. |

To this category belong also certain acid compounds which do not contain a carboxy group, such as:

|  |  | Decomposition at |
|---|---|---|
| NO₂NHCONHCONH₂ | Nitrobiuret | 170–180° C. |
| NO₂NHCONHCONHNO₂ | Dinitrobiuret | 225° C. |

Finally, a fourth class (class D) consists of these acid compounds whose acid group is destroyed upon heating, said compounds simultaneously producing water (or an alkaline product and water).

The influence of moisture on the formation of azodyes is well known, and it is therefore logical that a release of water vapour will promote heat-developing of the copies.

These acids are, for example, the oximes of most of the ketoacids mentioned in the above groups. The degradation reaction is then essentially the following:

R—C—COOH  ⟶  R—CN + CO₂ + H₂O
‖
NOH

The alpha-oximes are preferred, since their decomposition point is lower than that of the beta-oximes.

by the following fact. The introduction into the diazotype material of the present invention of even small amounts of the additives commonly used in the diazotype process for the stabilization of diazotype materials (citiric acid, tartaric acid, boric acid, naphthalene trisulfonic acid, zinc chloride, aluminum sulfate, etc.) prevents any formation of dye on heating due to their ability of absorbing large amounts of ammonia. Indeed, it is quite normal that a polyfunctional acid or a polyvalent ion salt will require, for the neutralization or for the formation of the hydroxide thereof, large amounts of ammonia, and still more so as large amounts of said additives having relatively low acidity must be employed in order to obtain a pH value of about 2 which is necessary for producing stability of the diazonium compounds.

Similarly, introduction of hygroscopic materials such as glycerin and polyalcohols which are habitually employed in diazotype process formulations must be avoided due to the deleterious action of moisture during storage.

It goes without saying that when the various requirements set forth above are fulfilled according to the present invention, the result obtained will depend to a nonnegligible extent upon the selection of the diazonium compound and of the coupling agent, with respect to their resistance to temperature.

Indeed, some degree of degradation of the diazotype paper cannot be prevented on heating to 120–160° C. The density of the resultant copy will be a function of two competitive reactions: the reaction due to the rate of formation of the dye, and the reaction due to the destruction of the diazonium compound. Of the various diazonium compounds tested, the diazonium derivative of p-dimethylaminoaniline was found to offer the best resistance to heat, although utilization of other compounds is not excluded when the rate of formation of the dye is very great.

The following examples are given for illustrative, not limitative, purposes, and described a selection of various combinations of diazonium compounds and of coupling agents which come within the requirements of the present invention and which are capable of producing any desired colors, said selection being meant to serve as a guide to those familiar with the art.

In said examples, all parts are by weight, except when otherwise indicated. Moreover, when the acid stabilizer is selected from one of the categories A, B, C or D set forth above, this has been mentioned.

EXAMPLE 1

The following sensitizing composition is cast onto coated or uncoated paper:

| | |
|---|---|
| Water | 100 |
| Methanesulfonic acid | 2 |
| Urea | 30 |
| Diazonium derivative of p-dimethylaminoaniline | 6 |
| 2,3-dihydroxy-6-sulfonaphthalene | 6 |
| 1% saponine solution | 5 |

Subsequent heating of said paper to a temperature of 120–160° C. produces a blue copy.

EXAMPLE 2

The following solution is used:

| | |
|---|---|
| Water | 120 |
| Sulfamic acid | 5 |
| Thiourea | 40 |
| Urea | 5 |
| Diazonium derivative of p-dimethylaminoaniline | 6 |
| 2,3-dihydroxy-6-sulfonaphthalene | 6 |
| Phloroglucinol | 10 |
| Methyl cellulose, 20% aqueous solution | 2 |
| Colloidal or noncolloidal powdered silica | 2 |
| Saponine | 5 |

Prior to casting, the mixture is agitated for a sufficient time to effect good dispersion of the silica throughout.

Heating of said paper results in a black copy.

For purposes of paper preservation, it may be desirable to protect the developing agent against untimely reaction with the other constituents. Said protection may be effected by introducing part or all of the developing agent in a prior coating or overcoating. In this case, it is advisable that the prior coating or the overcoating be insulated from the sensitive layer, which can be effected by adding certain compounds which will generally consist of polymers.

The protection of the developing agent may also serve to remedy simultaneously an incompatibility of the constituents of the dye. Thus, the following example is an illustration of a composition containing a diazonium compound and a coupling agent which cannot be cast in a single layer owing to the formation of tarry products.

EXAMPLE 3

A first layer is cast with the following materials:

| | |
|---|---|
| Water | 100 |
| Thiourea | 30 |
| Urea | 10 |
| Diazonium derivative of 4-benzoylamino-2,5-diethoxyaline | 6 |
| Polyvinyl alcohol, 5% solution | 20 |
| Saponine, 1% solution | 5 |

After drying, a second layer is cast:

| | |
|---|---|
| Water | 100 |
| Sulfamic acid | 3 |
| Neville winter acid | 6 |
| Saponine | 5 |

Developing at 120–160° C. yields a violet copy.

EXAMPLE 4

On a coated or uncoated paper, said coating being formed in a manner known per se, the following solution is cast:

| | | |
|---|---|---|
| Water | ml | 100 |
| Glycolic acid, 20% solution (A) | ml | 40 |
| Diazonium derivative of p-dimethylaminoaniline | g | 4 |
| 2,3-dihydroxy-6-sulfonaphthalene | g | 10 |
| Urea | g | 10 |
| Ethylurea | g | 20 |
| Sulfamide | g | 10 |
| Saponine, 1% solution | ml | 5 |

EXAMPLE 5

The following solution is cast:

| | | |
|---|---|---|
| Water | ml | 100 |
| N,N-diethyloxamide (B) | g | 5 |
| Ethylurea | g | 20 |
| Ethylsulfamide | g | 15 |
| Diazonium derivative of p-dimethylaminoaniline | g | 4 |
| 2,3-dihydroxy-6-sulfonaphthalene | g | 12 |

As set forth above, the stabilizers may also be employed in mixtures cast on a precoat containing a developing agent, said precoat being preferably formulated so that diffusion of the reagents from one layer to the next be either low or nonexistent.

Another application of this principle will be found hereunder.

EXAMPLE 6

10% by volume of the commercial product known under the trade name of "Paragyl" (aqueous paraffin and cellophane emulsion) is cast in a precoating mixture with a basis of noncolloidal silica prepared in a manner known per se. Ethylurea is then added in a ratio of 20% of the volume. This mixture is cast as a precoat and dried. The following sensitive solution is then cast:

| | | |
|---|---|---|
| Water | ml | 100 |
| Ethylurea | g | 10 |
| Thiourea | g | 10 |
| 3-nitrobenzoyl-formic acid (B) | g | 2.5 |
| Diazonium derivative of 4-dimethylaminoaniline | g | 4 |
| 2,3-dihydroxy-6-sulfonaphthalene | g | 15 |

An alternate application of this principle consists in incorporating all or part of the developing material while the paper is being manufactured, during the surface sizing procedure.

EXAMPLE 7

The surface sizing is effected on the paper manufacturing machine, by means of a solution containing, for example: 2–6% of soluble start and 10–40% of developing agent.

The paper is then coated with the solution described in Example 6, or in any other example.

EXAMPLE 8

A diazotype paper is coated with the following solution:

| | | |
|---|---|---|
| Water | ml | 100 |
| Formyl-oxaluric acid (C) | g | 4 |
| Urea | g | 20 |
| Thiourea | g | 10 |

Diazonium derivative of p-dimethylaminoaniline
  _____ g-- 4
2,3-dihydroxy-6-sulfonaphthalene _____ g-- 15

EXAMPLE 9

The following solution is cast in similar fashion:

Water _____ ml-- 100
Formyl citryluric acid (C) _____ g-- 5
Ethylurea _____ g-- 20
Thiourea _____ g-- 10
Diazonium derivative of p-dimethylaminoaniline
  _____ g-- 4
2,3-dihydroxy-6-sulfonaphthalene _____ g-- 12
Saponine, 1% solution _____ ml-- 5

The formyl-citruric acid used in this example is a new compound which may be prepared as follows:

The following mixture is refluxed for six hours:

Acetic acid _____ ml-- 250
Formylurea (¼ mol) _____ g-- 22
Citric acid (¼ mol) _____ g-- 48

The resultant solution is then evaporated dry under a vacuum.

After recrystallization from ethanol, the residue yields 15 g. of the desired product, melting at 120° C. and releasing ammonia at 155° C.

EXAMPLE 10

The following sensitizing solution is used:

Water _____ ml-- 100
Nitrobiuret (C) _____ g-- 5
Ethylsulfamide _____ g-- 10
Thiourea _____ g-- 20
Diazonium derivative of p-dimethylaminoaniline
  _____ g-- 4
2,3-dihydroxy-6-sulfonaphthalene _____ g-- 15
Saponine, 1% solution _____ ml-- 5

EXAMPLE 11

This example is another illustration of a two-layer casting. The following precoat is used first:

Water _____ ml-- 100
Colloidal silica _____ g-- 5

After four hours of vigorous stirring, the following materials are added:

Methyl cellulose, 4% solution _____ ml-- 10
Polymer known under the trade name "Styrophan D" _____ ml-- 50
Ethylurea _____ g-- 25

After drying, the light sensitive solution is cast:

Water _____ ml-- 100
Thiourea _____ g-- 50
Benzoyl-formic acid oxime (D) _____ g-- 6
Diazonium derivative of p-dimethylaminoaniline
  _____ g-- 4
2,3-dihydroxy-6-sulfonaphthalene _____ g-- 15
Saponine, 1% solution _____ ml-- 5

Finally, an important alternate embodiment of the present invention comprises using a mixture of stabilizing acids.

In this case, the pH will be adjusted to the desired level by means of a very strong decomposable or nondecomposable acid. A certain amount of weaker decomposable acid will then be added, for the purpose of insuring good stability of the paper.

This procedure makes it possible to use weaker decomposable acids which are incapable of insuring good stability of the paper when used alone.

The following example is an illustration of this alternate procedure:

EXAMPLE 12

Water _____ ml-- 100
Sulfamic acid _____ g-- 2
Camphocarbonic acid (B) _____ g-- 4
Thiourea _____ g-- 20
Methylurea _____ g-- 20
Diazonium derivative of p-dimethylaminoaniline
  _____ g-- 4
2,3-dihydroxy-6-sulfonaphthalene _____ g-- 3

Heat-developing yields a blue colored copy.

The diazotype materials according to the present invention possess obvious advantages with regard to their utilization over the prior diazotype materials. Indeed, their development requires no gaseous or liquid reagent which is difficult or inconvenient to handle.

Moreover, the materials of the present invention make it also possible to obtain copies by means of the so-called reflection process.

In said process, a sensitized sheet is placed over the original to be reproduced and is submitted to infrared radiation. Said radiation goes through the sensitive sheet, is absorbed by the dark areas of the original and is reflected by the light areas. In said conditions, the temperature of the dark areas of the original is increased and induces the development of the color on the sensitive sheet. When the latter is placed with the emulsion facing the infrared source, a direct positive copy is obtained. When the emulsion faces the original, an inverted positive copy is obtained. In order to obtain ultimate fixing of the image, there remains only to destroy by exposure to light the excess diazonium salt remaining in the sensitive sheet.

Although specific embodiments of the invention have been described, many modifications and changes may be made therein without departing from the scope of the invention as defined in the appended claims.

Having now described my invention what I claim as new and desire to secure by Letters Patent is:

1. A heat-developable diazotype material comprising a support and a coating on said support, said coating consisting essentially of a diazonium compound, a coupling agent for said diazonium compound, a stabilizer and a developing agent, said developing agent being constituted by at least one member of the group consisting of ureas, thioureas, sulfamides and derivatives thereof resulting from substitution by organic radicals, and said stabilizer being at least one acid compound having a dissociation constant at least equal to $10^{-3}$, and selected from the group consisting of nitrobiuret, dinitrobiuret and carboxylic acids capable of becoming substantially less acidic and of evolving $NH_3$ upon heating.

2. A heat-developable diazotype material comprising a support and a coating on said support, said coating being free of any substantial precoupling and consisting essentially of (1) a diazonium salt, (2) a coupler for said diazonium salt, (3) a urea, and (4) a carboxylic acid stabilizer, said stabilizer having the property of becoming substantially less acidic when heated alone to about the temperature at which said urea releases ammonia, so that said acid stabilizer prevents any substantial precoupling in said coating until the development temperature is reached, whereby development occurs as a result of the decrease in the acidity of said acid stabilizer upon heating.

3. A heat-developable diazotype material comprising a support and a coating on said support, said coating consisting essentially of a diazonium compound, a coupling agent for said diazonium compound, a stabilizer and a developing agent, said developing agent being constituted by at least one member of the group consisting of urea, methylurea, dimethylurea, ethylurea, methylolurea, dimethylolurea, thiourea, ethylthiourea, ethylallylthiourea, sulfamide, methylsulfamide, dimethylsulfamides, ethylsulfamide, diethylsulfamides, and phenylsulfamide, and said stabilizer being at least one acid compound having a dissociation constant at least equal to $10^{-3}$, and selected from the group consisting of nitrobiuret, dinitrobiuret and carboxylic acids capable of becoming substantially less acidic and of evolving $NH_3$ upon heating.

4. A heat-developable diazotype material comprising a support and a coating on said support, said coating consisting essentially of a diazonium compound, a coupling agent for said diazonium compound, a stabilizer and a developing agent, said developing agent being constituted by at least one member of the group consisting of ureas, thioureas, sulfamides and derivatives thereof resulting from substitution by organic radicals, and said stabilizer being at least one acid compound having a dissociation constant at least equal to $10^{-3}$, and being selected from the group consisting of cityluric acid, formyl-cityluric acid, oxaluric acid, allyl-oxaluric acid, ethyl-oxaluric acid, formyl-oxaluric acid, formyl-maleyluric acid, nitrobiuret and dinitrobiuret.

5. The heat-developable diazotype material of claim 1, wherein said developing agent is present in an amount sufficient to raise the pH of the diazotype material to an effectively acid value in excess of 5 upon heating.

6. The heat-developable diazotype material of claim 3, wherein said developing agent is present in an amount sufficient to raise the pH of the diazotype material to an effectively acid value in excess of 5 upon heating.

7. The heat-developable diazotype material of claim 4, wherein said developing agent is present in an amount sufficient to raise the pH of the diazotype material to an effectively acid value in excess of 5 upon heating.

References Cited
UNITED STATES PATENTS

| | | | |
|---|---|---|---|
| 2,429,249 | 10/1947 | Von Glahn et al. | 96—91 |
| 2,495,827 | 1/1950 | Slifkin | 96—91 |
| 2,653,091 | 9/1953 | Greig | 96—49 |
| 2,657,141 | 10/1953 | Kessels | 96—49 |
| 2,732,299 | 1/1956 | Morrison | 96—49 |
| 2,748,024 | 5/1956 | Klimkowski et al. | |
| 737,711 | 7/1951 | Galley. | |
| 2,694,009 | 11/1954 | Sus | 96—91 |
| 2,727,820 | 12/1955 | Botkin | 96—91 |
| 3,046,128 | 7/1962 | Klimkowski et al. | 96—91 |

NORMAN G. TORCHIN, *Primary Examiner.*

C. BOWERS, *Assistant Examiner.*

U.S. Cl. X.R.

96—75, 49; 117—36.8; 250—65.1